(12) United States Patent
Ignatowski

(10) Patent No.: US 7,322,214 B2
(45) Date of Patent: Jan. 29, 2008

(54) CONVERTIBLE EYEGLASS RETAINER/JEWELRY ARTICLE

(76) Inventor: Patricia M. Ignatowski, 8828 W. Melody La., Greenfield, WI (US) 53228

( * ) Notice: Subject to any disclaimer, the term of this patent is extended or adjusted under 35 U.S.C. 154(b) by 0 days.

(21) Appl. No.: 11/531,760

(22) Filed: Sep. 14, 2006

(65) Prior Publication Data

US 2007/0006612 A1 Jan. 11, 2007

Related U.S. Application Data

(60) Division of application No. 10/352,259, filed on Jan. 27, 2003, now abandoned, which is a continuation-in-part of application No. 09/456,256, filed on Dec. 7, 1999, now Pat. No. 6,520,635, which is a continuation-in-part of application No. 09/098,406, filed on Jun. 16, 1998, now Pat. No. 6,027,213, which is a division of application No. 08/688,037, filed on Jul. 26, 1996, now Pat. No. 5,794,459, which is a continuation-in-part of application No. 08/637,195, filed on Apr. 8, 1996, now Pat. No. 5,675,988.

(51) Int. Cl.
A44C 15/00 (2006.01)
(52) U.S. Cl. ............................................. 63/38; 351/52
(58) Field of Classification Search ...................... None
See application file for complete search history.

(56) References Cited

U.S. PATENT DOCUMENTS

| 129,871 | A | 7/1872 | Stevens .................. 63/3 X |
| 301,491 | A | 7/1884 | Gibbons .................. 63/21 X |
| D47,996 | S | 10/1915 | Guinis et al. .................. D11/2 |
| 1,683,545 | A | 9/1928 | Harris .................. 63/3.1 X |
| 2,086,468 | A | 7/1937 | Bryan .................. 63/3 X |
| 2,125,362 | A | 8/1938 | Scribner .................. 24/3.13 |
| 2,180,726 | A | 11/1939 | Bradley .................. 63/36 |
| 2,224,721 | A | 12/1940 | Chernow |
| 2,228,686 | A | 1/1941 | Bezault .................. 63/4 X |
| 2,244,944 | A | 6/1941 | Furlonge .................. 63/36 |
| 2,494,750 | A | 1/1950 | Fornicoia |
| 2,677,901 | A | 5/1954 | Tilleman |
| 2,763,981 | A | 9/1956 | Blumstein |
| 2,766,500 | A | 10/1956 | Chanko |
| 2,766,541 | A | 10/1956 | Quinones et al. .............. 41/34 |
| 2,779,523 | A | 1/1957 | Klimkiewicz .................. 63/3 X |
| 2,960,787 | A | 11/1960 | Quinones et al. .............. 41/34 |
| 3,010,365 | A | 11/1961 | Sadel .................. 88/52 |
| 3,098,364 | A | 7/1963 | Verri |
| 3,163,026 | A | 12/1964 | Kenny .................. 63/14.2 |

(Continued)

FOREIGN PATENT DOCUMENTS

JP 57210321 A 12/1982

*Primary Examiner*—Jack W. Lavinder
(74) *Attorney, Agent, or Firm*—Quarles & Brady LLP

(57) ABSTRACT

An article convertible from an eyeglass retainer to multiple independent jewelry articles has three strands that can be linked together to form a single continuous strand with optical couplers at each end for mounting to the temple arms of conventional eyeglasses. The strands can be uncoupled to form various jewelry items, such as a necklace, bracelet and dangling glass extensions. The strands are made of a plurality of decorative jewelry elements, such as beads, bars charms and other adornments linked together end to end. Bayonet type connections between the strands and decorative accessories coupled thereto make for quick and easy conversion from eyeglass retainer to jewelry items.

3 Claims, 14 Drawing Sheets

U.S. PATENT DOCUMENTS

| | | |
|---|---|---|
| 3,168,768 A | 2/1965 | Bohlinger et al. |
| 3,382,569 A | 5/1968 | Dowling |
| 3,733,852 A | 5/1973 | Johnson et al. |
| 3,979,795 A | 9/1976 | Seron |
| D244,126 S | 4/1977 | Ladjimi ................... D11/8 |
| 4,136,934 A | 1/1979 | Seron |
| 4,153,346 A | 5/1979 | Gomer ...................... 351/52 |
| 4,286,360 A | 9/1981 | Skobel |
| 4,393,552 A | 7/1983 | Frankel |
| 4,411,050 A | 10/1983 | Couture |
| 4,471,509 A | 9/1984 | Marks ........................ 24/3 |
| 4,527,316 A | 7/1985 | Murphy |
| 4,753,514 A | 6/1988 | Kubik |
| 4,912,944 A | 4/1990 | Crosley et al. |
| 4,927,258 A | 5/1990 | McKenna et al. |
| 4,938,581 A | 7/1990 | Trickel |
| 4,968,128 A | 11/1990 | Mendota |
| 4,974,955 A | 12/1990 | Treadaway ................ 351/123 |
| 4,974,956 A | 12/1990 | Gill ............................. 351/156 |
| D313,368 S | 1/1991 | Peterson |
| 5,005,263 A | 4/1991 | Barrett |
| 5,024,515 A | 6/1991 | Beckemeyer et al. ......... 351/52 |
| 5,031,420 A | 7/1991 | Song ............................. 63/21 |
| 5,087,118 A | 2/1992 | Gill |
| D324,871 S | 3/1992 | Cordet et al. |
| 5,092,668 A | 3/1992 | Welch et al. |
| 5,161,234 A | 11/1992 | Nita ............................. 351/52 |
| 5,414,907 A | 5/1995 | Kiapos ......................... 24/3.3 |
| 5,475,449 A | 12/1995 | Pyle |
| 5,654,787 A | 8/1997 | Barison ...................... 351/52 |
| 5,669,242 A | 9/1997 | Cayton |
| 5,675,988 A | 10/1997 | Ignatowski .................... 63/38 |
| 5,794,459 A | 8/1998 | Ignatowski .................... 63/38 |
| 5,896,184 A | 4/1999 | Lowe et al. ................... 351/52 |
| 6,027,213 A | 2/2000 | Ignatowski |
| 6,210,003 B1 | 4/2001 | Chan |
| 2004/0200236 A1* | 10/2004 | Emberson et al. ............. 63/23 |

* cited by examiner

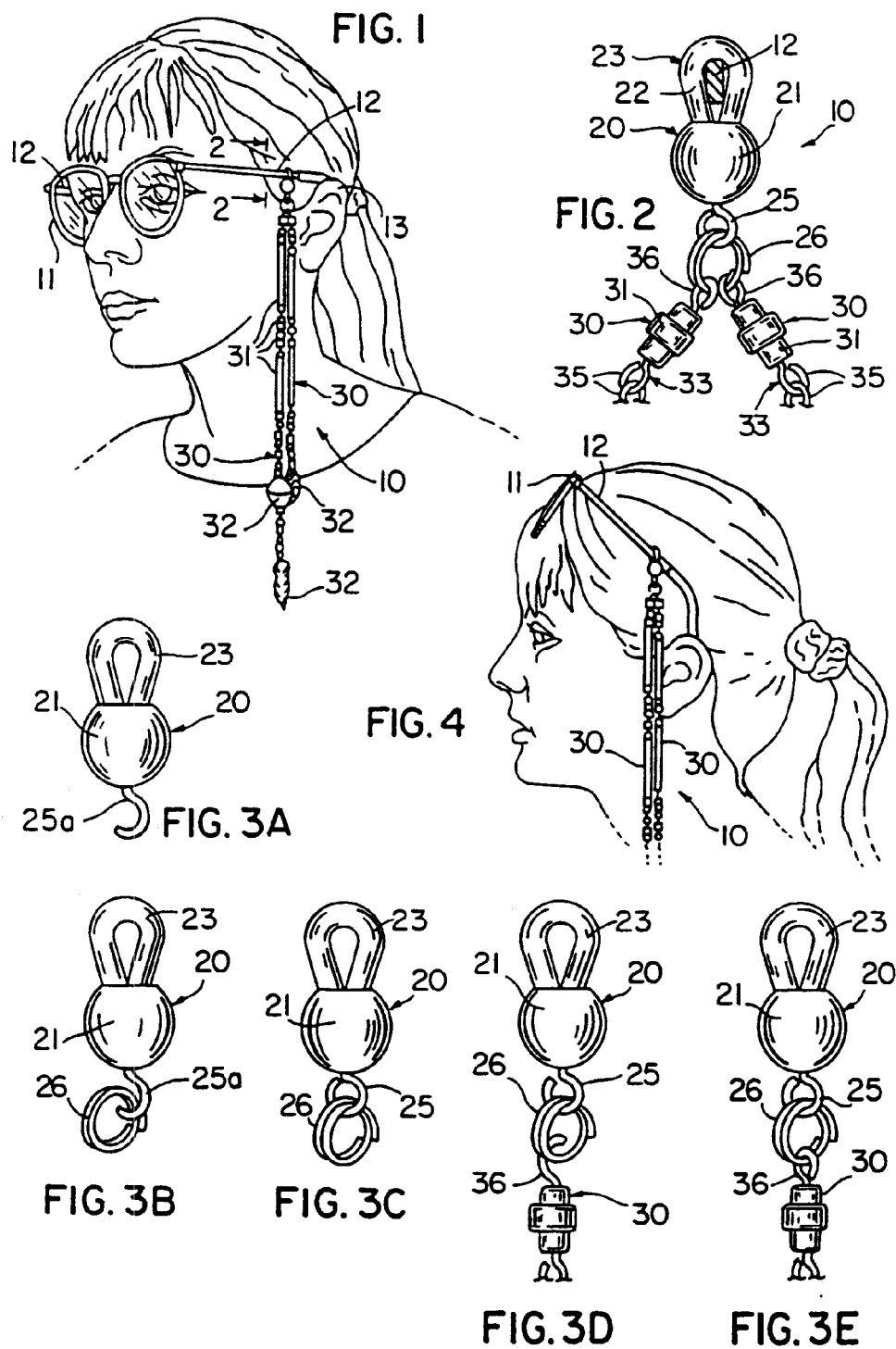

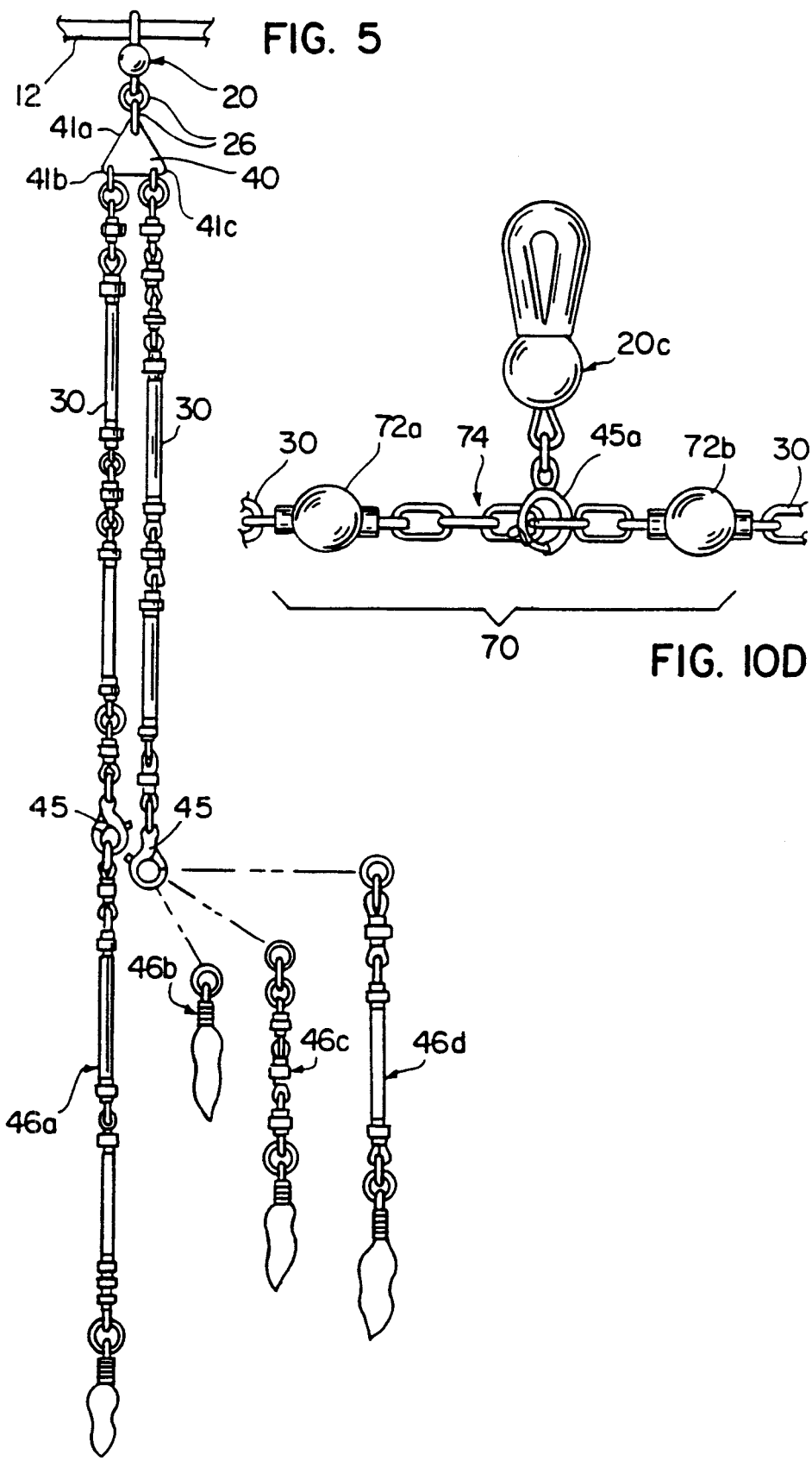

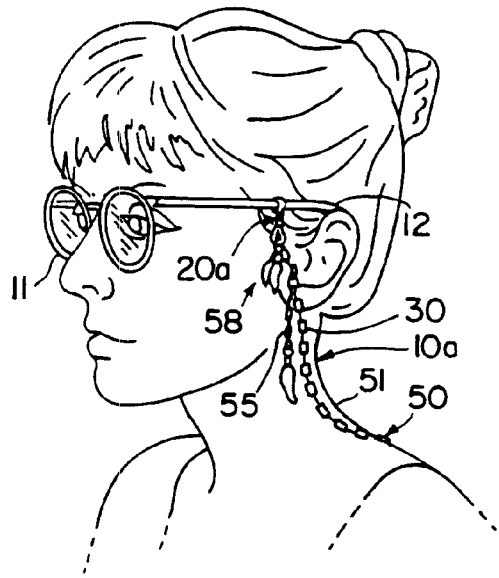
FIG. 7
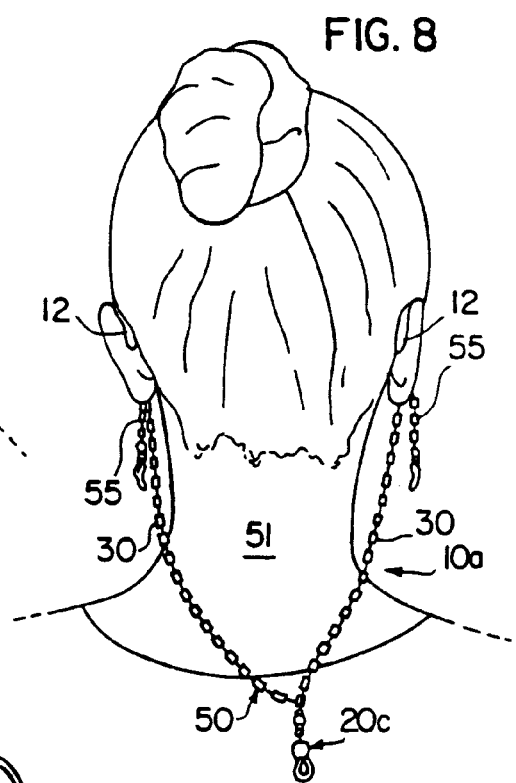
FIG. 8
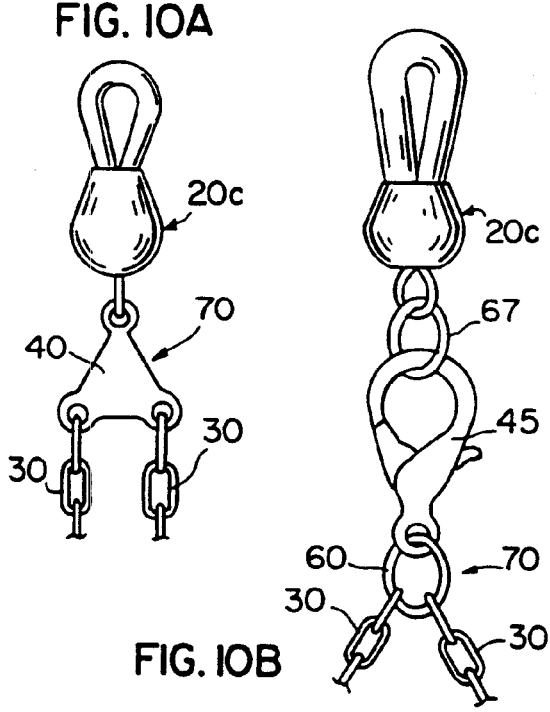
FIG. 10A
FIG. 10B
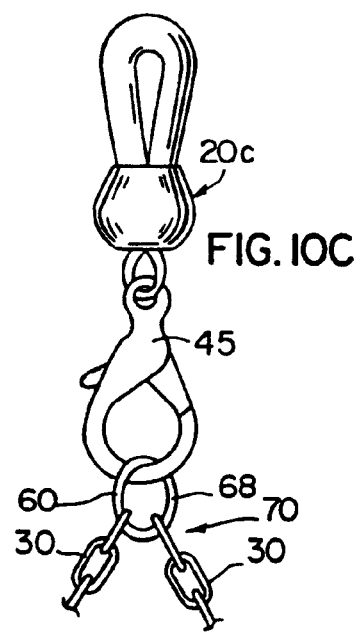
FIG. 10C

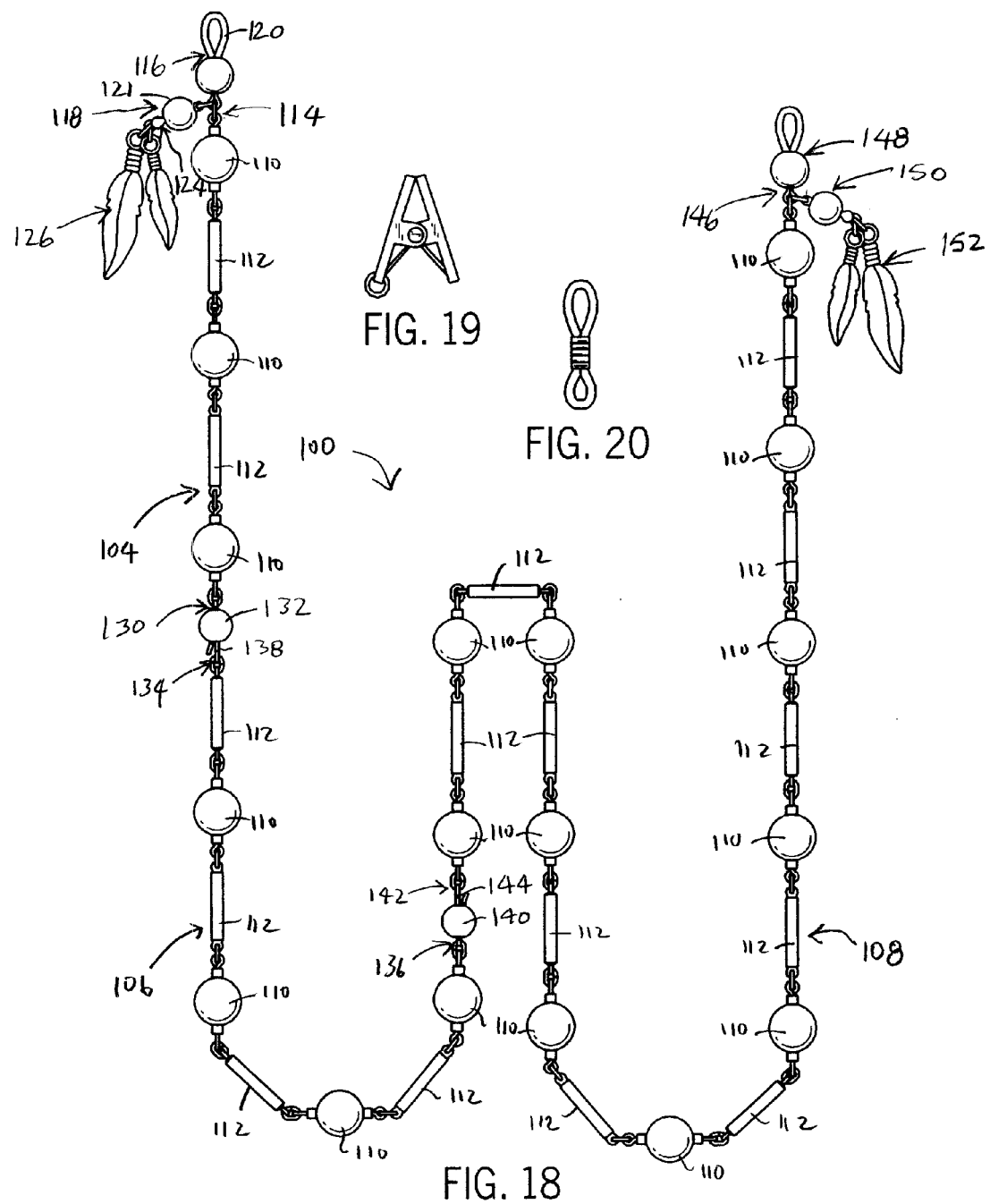

CONVERTIBLE EYEGLASS RETAINER/JEWELRY ARTICLE

CROSS-REFERENCE TO RELATED APPLICATIONS

This application is a divisional of U.S. application Ser. No. 10/352,259, filed Jan. 27, 2003 now abandoned, which is a continuation-in-part of U.S. application Ser. No. 09/456,256, filed Dec. 7, 1999 now U.S. Pat. No. 6,520,635 (now allowed) which is a continuation-in-part of U.S. application Ser. No. 09/098,406, filed Jun. 16, 1998 (now U.S. Pat. No. 6,027,213) which is a divisional of U.S. application Ser. No. 08/688,037 filed Jul. 26, 1996 (now U.S. Pat. No. 5,794,459) which is a continuation-in-part of U.S. application Ser. No. 08/637,195, filed on Apr. 8, 1996 (now U.S. Pat. No. 5,675,988).

FIELD OF THE INVENTION

The field of the invention is jewelry, more particularly a convertible jewelry/eyeglass retainer article.

BACKGROUND OF THE INVENTION

Eyeglass retainers, holders or suspenders are used to suspend a pair of eyeglass about the wearer's neck when the eyeglasses are not being used to improve the wearer's visual acuity. Conventional eyeglass retainers are simple one-piece strings or elastic bands the ends of which tie or slide onto the temple arms of the eyeglasses (see e.g., U.S. Pat. Nos. 4,136,934 and 4,927,258). The eyeglass retainers could also simply be two chords tied together at one end and attached to opposite temple arms at the other. The ends of the retainers can also have optical couplers which are commonly an elastic loop that fits snuggly around the temple arm.

Conventional eyeglass retainers or single-use items, that is they do not serve any other intended purpose than to suspend one's eyeglasses when not in use. Thus, when the retainer is detached from the eyeglasses they are generally of no use. Additionally, conventional eyeglass retainers are not decorative and thus at best do not add to, and likely detract from, the aesthetic appearance of the wearer.

Accordingly, an eyeglass retainer that is both decorative when used as a retainer as well as functional, particularly to add decoration to the wear's head, when not used as a retainer is needed in the art.

SUMMARY OF THE INVENTION

A convertible eyeglass retainer and jewelry article includes three elongated decorative strands. Each strand has opposite first and second ends. Two of the strands each have an optical coupler at one end and a strand coupling member at the other end. The third strand has a strand coupling member at each end. The optical couplers allow for attachment of the first and second strands to opposite temple arms of a pair of eyeglasses and the strand coupling members allow for linking of the third strand to ends of the other two strands so as to form an eyeglass retainer.

In the most preferred form, the strand coupling members of the third strand are detachable from other strands so that when the strands are unlinked the article forms at least two separate jewelry items.

In another preferred form, when the strands are unlinked they form a necklace and two decorative eyeglass extensions. In this case, the two, preferably equal length strands, connectable to the eyeglass form the eyeglass extensions and the longer third strand forms the necklace. The two eyeglass extension are connectable at one end to the eyeglass temple arms via the optical couplers and the necklace is formed by linking the strand coupling members at the ends of the longest strand.

In another preferred form, when the strands are unlinked they form a necklace, a bracelet and an eyeglass extension. In this case, the longest strand forms the necklace, the shortest strand forms the eyeglass extension and the third intermediate-length strand forms the bracelet.

In yet another preferred form, when the strands are unlinked they can form a necklace and a double-stranded glass extension. In this case, the longest strand forms the necklace and the other two strands form a doubled-stranded glass extension, the shorter strand (having the other optical coupler) having an accessory coupling member to which a strand coupling member of the intermediate length third strand is detachably linked.

The article can further be converted to form a jewelry article in which one of the strands is linked to additional accessory strand or one of the other strands comprising the retainer but in a different configuration. In one such preferred form, the jewelry article includes two of the strands linked together with a combination coupler, having an optical coupler and a strand coupling member, to form a looped or U-shaped extension suspended at two points from one temple arm of the eyeglasses.

The article can also include an accessory coupling member connected to one or both of the strands having the optical couplers, preferably at the ends of these strands where the optical couplers are affixed. The article can then have one or more accessories having a complimentary accessory coupling member detachably engagable with the accessory coupling member(s). The accessories, for example, can be eyeglass extensions or decorative charms. Another accessory can be a decorative hair clip attachable to any of the strand coupling members, preferably having opposing jaws biased in contact with each other and a decorative escutcheon mounted to one of the jaws.

In still other preferred forms, the strand and accessory coupling members can be bayonet style connections a pin clip and a spherical member defining a socket sized to receive the pin clip. The optical couplers can be spring fixed or adjustable loop type optical fasteners or other spring clips or clamps. The strands can be formed by a plurality of linked decorative elements, including beads, bars, gemstones and other such elements made of precious or non-precious metals or natural or synthetic stones.

The present invention thus provides a three (or more) piece article that can be quickly and easily converted from a decorative eyeglass retainer, allowing a pair of eyeglasses to be suspended about the wear's neck when not used, to a plurality of jewelry pieces, such as a necklace, a bracelet, eyeglass adornments and hair jewelry. These items can be formed largely by unlinking the main three strands from each other and then, in the case of the necklace and bracelet coupling together the opposite ends of a single strand, or in the case of eyeglass extensions simply suspending one of the strands with an optical coupler from the temple arm and allowing its other end to hang freely. Other jewelry items can be formed by linking a strand to additional accessory pieces, such as a hair clip, or by linking two or all three strands together, but in configurations other than simply end to end (as when forming the eyeglass retainer). Simple and dependable (yet decorative) coupling members, forming connections such as bayonet type connections, allow each end of the strands (and accessories) to be simply linked and detached quickly, and in the case of the bayonet connections simply "plugged into one another", to create the desired arrangement. Furthermore, linking the strands not only forms the eyeglass retainer but also is a convenient way to keep together various jewelry items to reduce the likelihood of the items being misplaced.

These objects, together with other objects and advantages, will be apparent from the following description in which reference is made to the accompanying drawings which form a part hereof. The full scope of the invention is not limited to such descriptions, but is set forth in the claims below.

BRIEF DESCRIPTION OF THE DRAWINGS

FIG. 1 is a perspective view showing a jewelry article according to the invention in use;

FIG. 2 is a sectional view taken on line 2-2 of FIG. 1;

FIGS. 3A-3E are plan views showing a construction sequence for the jewelry article of FIG. 1;

FIG. 4 is a side elevational view showing the jewelry article of FIG. 1 in an alternative orientation of use;

FIG. 5 is a plan view of a second embodiment of a jewelry article according to the invention;

FIG. 7 is a perspective view of the jewelry article of FIG. 6 being used in a second operative configuration;

FIG. 8 is a rear view of the jewelry article of FIG. 7;

FIGS. 10A-10D are detailed views of alternative attachment anchors which may be used as a part of the jewelry article according to the third embodiment of the invention;

FIG. 18 is a plan view of the article illustrated in FIG. 17 shown in isolation;

FIGS. 19 and 20 show alternate optical couplers for connecting the article to one's eyeglasses;

DESCRIPTION OF THE PREFERRED EMBODIMENTS

Figure 6:
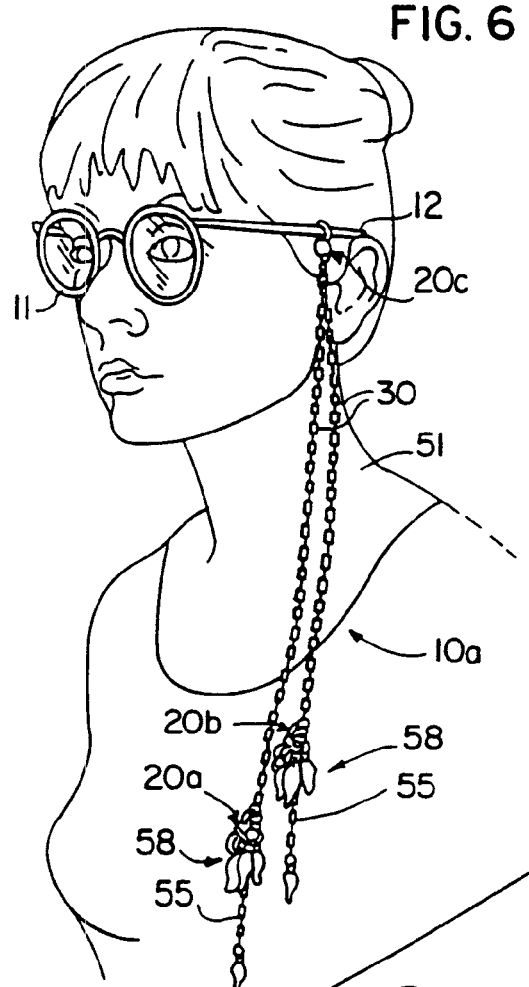
FIG. 6 is a perspective view of a jewelry article according to a third embodiment of the invention being used in a first operative configuration.

Referring to FIG. 1, an article of jewelry 10 according to the present invention is adapted for use in conjunction with an eyeglass frame 11 worn by the user. In that regard, the jewelry article 10 has the appearance of being an adjunct to, and an extension of, the eyeglass frame 11, and for that reason is referred to as a "glass extension". As with other jewelry forms, the jewelry article 10 is an artistic decoration which permits adornment of the user in a new and innovative manner. Eyeglasses are usually worn out of necessity, either for correction of visual acuity or for reduction of brightness and glare (i.e., sunglasses) and are normally regarded as being undesirable from an appearance standpoint. However, the jewelry article 10 now provides the wearer a new form of personal expression since the jewelry article 10 may be formed with a wide variety of jewelry styles and arrangements within the scope of the invention.

Referring to FIGS. 1 and 2, the eyeglass frame 11 includes temple arms 12 extending from the front of the frame to the top, and possibly around behind the user's ear 13, with the temple arms terminating in an open end 14. The jewelry article 10 includes a gripping member 20 which is slidably receivable over the open end of the temple arm 12 to be positioned on the temple arm 12 forward of the user's ear 13. Because the jewelry article 10 according to the invention is formed as a unitary jewelry item, the jewelry article 10 may be used individually on only one temple arm 12 as illustrated in this embodiment, or alternatively may be used in either matched or unmatched pairs on both temple arms 12. Further, the unitary construction of the jewelry article 10 also permits attachment of multiple glass extensions 10 in an unbalanced fashion on the temple arms 12. For example, two or three glass extensions 10 may be placed on one temple arm 12 while the other temple arm is left without any. Thus, the wearer is free to express either a symmetrical or asymmetrical appearance by altering the number and order of jewelry article 10 on the temple arms 12.

Again referring to FIGS. 1 and 2, the gripping member 20 includes a main body 21 which cinches the ends of an elastic-cord material 22 to form an elastic loop 23 extending upwardly from the main body 21. The gripping member 20 also includes a small loop 25 which is preferably formed of a malleable metal extending downwardly from the main body 21. The loop 25 radially encircles an intermediate closed ring 26, so that the loop 25 and the intermediate closed ring 26 together form an attachment member for securely attaching one or more elongated decorative strands 30 which form the visually attractive part of the jewelry article 10. Alternatively, the attaching member may be formed as a second downwardly depending elastic loop, or without the ring 26 such that the terminal loop 36 is directly attached to loop 25, although the preferred structure is the aforementioned combination of loop 25 and ring 26. Gripping members 20 of this general type have been known to be used in pairs to form retaining necklaces for eyeglasses and are adaptable for use in this invention as described in detail below. For example, so called "eyeglass holders" suitable for use as the gripping members 20 in this invention are available from River Gems and Findings of Albuquerque, N. Mex. The intermediate closed ring 26 may be formed as a solid torus of metal or other suitable material, or may alternately be formed as a so-called "double ring", where a metallic wire is wrapped twice around in a circle. In the preferred form, small jeweler's double-rings may be used, such as those available from Darice, Inc., of Strongsville, Ohio.

Still referring to FIGS. 1 and 2, the elongated decorative strands 30 may be formed in a wide variety of known jewelry styles. In the illustrated embodiment, two elongated decorative strands 30 are shown, each of which is formed as a combination of beads 31 and assorted charms 32 strung together by interlinked jewelry wire 33. Alternatively, other suitable connectors can be used, including jewelry pins, thread, string, chain and bead cord. The jewelry wire 33 passes through hollow centers of the beads 31 and charms 32 along the length of the elongated decorative strands 30. Links between adjacent sections of the jewelry wire 33 are formed by bending the ends of the jewelry wire to form interlocking loops 35. Likewise, each elongated decorative strand 30 is preferably connected to the intermediate closed ring 26 by bending the topmost end of the jewelry wire radially around the intermediate closed ring 26 to form a terminal loop 36. The other end of each elongated decorative strand 30 may, for example, be terminated with one of the charms 32, also attached by forming a loop in the jewelry wire 33 around a corresponding loop (not shown) on the desired charm 32.

With the connections as described above, note that the elongated decorative strands 30 are securely affixed onto the intermediate closed ring 26. While some types of releasable jewelry clasps are known, such clasps are usually small and frail, and would thus be prone to failure given the weight and tugging forces that the elongated decorative strands 30 may be subjected to. Furthermore, releasability between the elongated decorative strands 30 and the gripping member 20 is not required in this invention, since the entire combination of the gripping member 20 and the securely attached elongated decorative strands 30 forms a unitary jewelry item which is designed to be changed only as a unit, e.g., by being slid on and off of the temple arm 12 of the eyeglass frame 11.

Referring now to FIGS. 3A-3E, the preferred construction of the jewelry article 10 can now be described. As mentioned above, a preferred form for the gripping member 20 is a prefabricated eyeglass holder, which is manufactured with a closed eye-loop depending from the main body. This closed eye-loop may be pried open with a small jeweler's pliers to present an open loop as shown in FIG. 3A. Then the intermediate closed ring 26 (such as the above mentioned commercially available "double ring" as illustrated) is placed over the open loop as shown in FIG. 3B, and the loop may then be bent back to the closed position as shown in FIG. 3C. In a similar manner, the topmost link of each elongated decorative strand 30 is first opened and placed over the intermediate closed ring 26 as shown in FIG. 3D, and then closed to complete the attachment as shown in FIG. 3E.

Referring to FIG. 4, people who wear eyeglasses sometimes desire to move the eyeglasses from the operative position directly in front of their eyes, to a holding position where the front of the eyeglass frame 11 rests atop the wearer's head. This is a common expedient, particularly when sunglasses or "reading-only" eyeglasses are used. This popular use of eyeglasses is not only readily accommodated, but in fact the jewelry article 10 according to the present invention continues to provide an adorning quality even though the eyeglass frame 11 has been moved to a non-operative position. In particular, since the joint between the gripping member 20 and the elongated decorative strands 30 is free to swivel, the elongated decorative strands 30 will still be drawn under gravity to an approximately vertical orientation. The elongated decorative strands 30 will also still be approximately in the same general area of the wearer's head, and thus continue to provide the desired accentuating effect.

Referring to FIG. 5 in another preferred form of the invention, a coupling member 40 attaches to the gripping member 20 using one or more intermediate rings 26. The coupling member 40 may be formed with three or more apexes 41a-41c, as in the triangular shape shown. The coupling member 40 itself is preferably decorated, as by engraving of a pattern or image, or by painting or other accentuating through the use of color although it is shown as a simple shape for simplicity. Such decorative coupling members 40 have been known and used in the art for other jewelry purposes. Each apex 41a-41c of the coupling member 40 includes a hole for use as an attachment point. The hole in apex 41a of the coupling member 40 attaches to the intermediate ring 26 for connection to the gripping member 20, while the holes in the other apexes 41b and 41c each connect to a single decorative strand 30.

The embodiment of FIG. 5 further contemplates that the decorative strands 30 may terminate in a releasable clasp 45, such as the illustrated "lobster-claw" clasp, as it is known in the art. Of course, any other type of releasable jewelry clasp may be used as well. By terminating with the releasable clasp 45, the jewelry article 10 in this embodiment is supportive of conventional jewelry accessories 46a-46d, which might have been used, for example, in conjunction with the previously-known hair extensions. One factor which has contributed to the popularity of hair extensions has been the ability to collect many different strands, charms, and other jewelry attachments to permit the wearer to personalize their appearance and to vary their appearance from time to time. Consequently, many people have already acquired a collection of such personalized hair-extension type accessories 46a-46d, and these can now be used with the jewelry article 10 by attachment to the releasable clasp 45. For example, if a person had previously used traditional hair extensions, but no longer does so because of a change in hair style, or because of the painstaking and time-consuming preparation required, the same hair-extension accessories 46a-46d can now be used without regard to hair style and with negligible preparation. In fact, drawn-back or short hair styles all but preclude the use of traditional hair extensions, but go particularly well with glass extensions 10 since the jewelry is all the more visible. Thus, the invention provides an alternative use of hair-extension type accessories 46a-46d which may otherwise be seldom used or obsolete.

Still referring to FIG. 5, when fitted with the releasable clasp 45, the strands 30 are preferably formed with a length shorter than the ultimately desired length, since the attachment of further devices 46a-46d is expected to add some length. Typically, the strands 30 in this form of the invention may be from two to eight inches in length from the attachment member to the releasable clasp 45. Also, when multiple strands 30 are used, the releasable clasps 45 may be offset from one another by forming the strands 30 with different lengths. The difference in length may be only a small amount, as illustrated, so that the clasps 45 do not interfere with each other, or may be a greater difference in length to provide a greater contrasting appearance between the strands.

Referring now to FIGS. 6-8, an alternative jewelry article 10A according to another novel embodiment is readily convertible between two different operative configurations. The alternative jewelry article 10A includes three different gripping members 20a-20c which are arranged to permit the glass extension to be used in both a first operative configuration as a single-sided glass extension, and in a second operative configuration as a combined double-sided glass extension and eyeglass holder. In the first operative configuration (FIG. 6), the jewelry article 10A is attached to a single temple arm 12 of the wearer's eyeglass frame 11 by the third gripping member 20c, and includes two or more decorative strands 30 which drape to one side of the wearer's head. Thus, in the FIG. 6 configuration, the jewelry article 10A has an appearance much the same as in the embodiment of FIG. 1, and provides all of the previously described advantages of the basic glass-extension invention. However, the modified jewelry article 10A also includes first and second gripping members 20a and 20b, respectively, which are each disposed along one of the strands 30. When the jewelry article 10A is worn as shown in FIG. 6, the first and second gripping members 20a and 20b are relatively unobtrusive, being somewhat obscured by other attachments, as will be described in detail later.

Referring primarily to FIGS. 7 and 8, the first and second gripping members 20a and 20b permit the jewelry article 10A to be converted to the second operative configuration, in which the jewelry article 10A has separate utility as an eyeglass retainer, as well as continuing to provide a decorative glass extension appearance. In this configuration, the first and second gripping members 20a and 20b are each attached to opposite temple arms 12 on the wearer's eyeglass frame 11, and the previously attached third gripping member 20c is detached and left loose. The aforementioned two strands 30 remain connected at the junction where they attach to the third gripping member 20c, and thus in effect form a continuous strand, or necklace portion 50 extending behind the wearer's neck 51. The necklace portion 50 formed by the strands 30 permits the jewelry article 10A to function as a conventional eyeglass retainer if the eyeglass frame 11 is removed from the operative position (FIGS. 7 and 8) and draped down the user's chest in the conventional manner (not shown).

Figure 9:
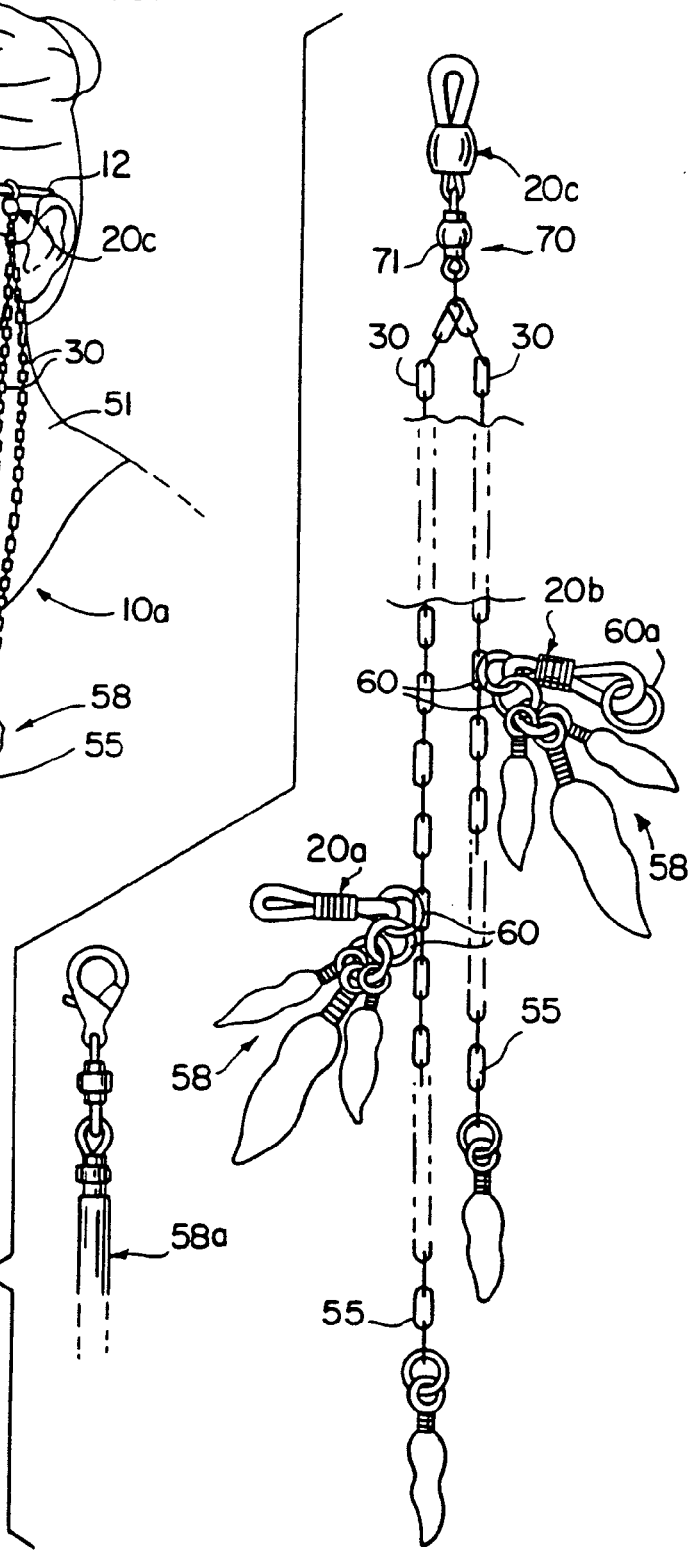
FIG. 9 is a plan view of the jewelry article of FIGS. 6-8.

Referring to FIGS. 7-9, the first and second gripping members 20a and 20b attach to the strands 30 at points towards the end of each respective strand 30, but far enough back from the ends of the strands 30 so as to leave a terminal end 55 on each strand 30. Thus, the terminal end 55 of each strand 30 extends beyond the first and second gripping members 20a and 20b, respectively. In the first operative configuration of FIG. 6, the terminal ends 55 fall under gravity to appear as straightline extensions of the upper portions of the respective strand 30. Decorative charms, beads, or other adornment, shown generally as jewelry attachments 58, are preferably attached to each strand 30 at the attachment point for the respective first and second gripping members 20a and 20b, and serve to both provide a decorative effect and to make the first and second gripping members 20a and 20b less readily noticeable. Then, when the jewelry article 10A is worn in the configuration of FIGS. 7 and 8, the terminal ends 55 pivot around the attachment points for the first and second gripping members 20a and 20b to hang approximately vertically, and combine with the necklace portion 50 to appear as glass extensions extending from both temple arms 12. Thus, the jewelry article 10A is convertible from a single-sided glass extension which is decorative only, to a double-sided glass extension which is both decorative and functional (e.g., as an eyeglass retainer).

Referring primarily to FIGS. 6, 8 and 9, note that the attachment points for the first and second gripping members 20a and 20b are preferably offset from one another. This arrangement serves to distribute the jewelry attachments 58 which accompany the first and second gripping members 20a and 20b and therefore provide a generally improved appearance when the jewelry article 10A is worn in the FIG. 6 configuration. Consequently, the third gripping member 20c will lie offset slightly from the exact back of the wearer's neck 51 when worn in the configuration of FIGS. 7 and 8. The offset of the third gripping member 20c in the latter configuration has no significant detrimental effect, but is merely a consequence of the unequal lengths of the strands 30 between the third gripping member 20c and the first and second gripping members 20a and 20b. Even though some degree of offset is preferred, the invention fully contemplates that the amount of offset may be varied more or less from that which is shown, and may even be eliminated to position the first and second gripping members 20a and 20b at symmetrical positions along the strands 30 with respect to the third gripping member 20c.

Referring now to FIG. 9, the set of jewelry attachments 58 may include any combination of fixed and removable decorative attachments, including charms, mounted stones or gems and other extending strands, such as removable jewelry attachment 58a illustrated. Fixed attachments may be made using any known expedient, including double rings 60 extending through chain links or any other convenient attachment point. Note that the first and second gripping members 20a and 20b are illustrated as being cinched, double-elastic loops, where an attachment ring 60a may even be used as an attachment point by encircling one of the elastic loops which is ultimately used to grip the temple arm 12 in the second operative configuration of FIGS. 7 and 8. A releasable clasp (not shown) may also be provided at these points for the attachment of other hair-extension type jewelry as described above in relation to FIG. 5.

In general terms, the necklace portion 50 of the jewelry article 10A includes an attachment anchor 70 which serves to provide an attachment point for the third gripping member 20c and thus to separate the two strands 30. In FIG. 9, the attachment anchor 70 is shown as using a decorative coupling bead 71 which fixedly links into the chain which forms the strands 30. Of course, any equivalent attachment may be used without necessarily using the decorative coupling bead 71. For example, FIGS. 10A-10D illustrate several alternative preferred forms for the attachment anchor 70. In FIG. 10A, a triangular shaped decorative coupling member 40, similar to that described above in relation to FIG. 5, may be used as the attachment anchor 70. In that case, both strands 30 may be fixedly attached onto two different corners of the coupling member 40, and the third gripping member may likewise be fixedly attached onto the third corner.

The invention also contemplates that the third gripping member 20c may be releasably attached to the jewelry article 10A, as shown in FIGS. 10B-10D, in which case the third gripping member 20c can be removed when not needed, e.g. in the second, or eyeglass retainer configuration (FIGS. 7 and 8). The releasable attachment may be formed either as a releasable clasp 45 fixed onto the strands 30 which engages a fixed loop 67 on the third gripping member 20c (FIG. 10B), or as a releasable clasp 45 fixed onto the third gripping member 20c which engages a fixed loop 68 connecting the strands 30 (FIG. 10C). In these cases, the attachment anchor 70 is the portion which is fixedly attached to and forms a part of the necklace portion 50, e.g., the clasp 45 and ring 60 of FIG. 10B, but only the ring 60 of FIG. 10C.

In FIG. 10D, another form of releasable attachment for the third gripping member 20c is shown. In this case, the attachment anchor 70 is formed by two stopping members 72a and 72b which are connected together by an intermediate strand 74. A smaller diameter releasable jewelry clasp 45a, when attached around the intermediate strand 74, is held captive between the two stopping members 72a and 72b, illustrated as larger diameter beads in FIG. 10D. The attachment anchor 70, (intermediate strand 74 and beads 72a and 72b) are attached in-line between the strands 30 to complete formation of the necklace portion 50. The jewelry clasp 45a may be, for example, a circular clasp with a spring loaded semicircular arm 75 which is retractable to expose an open segment. Clasps of this type are generally known for attaching jewelry of various kinds. The clasp 45a is fixed onto the third gripping member 20c. When attached over the intermediate strand 74, the clasp 45a, and thus the attached third gripping member 20c, are free to slide laterally along the intermediate strand 74, but are held captive between the beads 72a and 72b. It should be understood that in addition to the illustrated beads 72a and 72b, other types of stopping members may be used, provided that the clasp 45a is not able to pass over them. This permits the user a wide variety of decorative pieces to be used as the stopping members 72a and 72b. The attachment of FIG. 10D is therefore particularly advantageous in that when the jewelry article 10A is used in the configuration of FIGS. 7 and 8, the third gripping member 20c may be removed completely, and even though the attachment anchor 70 remains as a part of the necklace portion 50, it has a wholly decorative appearance without fixedly attached clasps or rings. Further, the length of the intermediate strand 74 may be varied from a short length (under an inch) to provide fairly precise positioning of the strands 30, to longer lengths of several inches, which permit the strands 30 to be repositioned by sliding the clasp 45a along the intermediate strand 74 to provide different effective lengths and offsets for the strands 30.

Referring again to FIGS. 10A-10D, it should further be appreciated that the combination of the third gripping member 20c, the attachment anchor 70, and the depending decorative strands 30 are sufficient within themselves to define a glass extension. In other words, even though these elements have been described in the context of a convertible jewelry article 10A as in the embodiment of FIGS. 6-9, the same elements may be used alone to form a single-sided glass extension, as in the other embodiments described herein. For example, other embodiments of glass extensions according to the invention may be formed using a gripping member (e.g., gripping member 20c) and an attachment anchor 70 coupled to two or more decorative strands 30, without necessarily including the first and second gripping members 20a and 20b since these elements alone define a glass extension. If the first and second gripping members 20a and 20b are not used, and the attachment anchor 70 is fixedly attached onto the gripping member 20c, then these embodiments would be similar to the other embodiments of FIGS. 1-5 and may be used in the same manner and with the same variation (e.g., terminating in a releasable clasp 45 as in the embodiment of FIG. 5). However, when the attachment anchor 70 is releasably attached to the gripping member 20c as in FIGS. 10B-10D, then the glass extension formed has the further advantages of both interchangability and the ability to combine multiple attachment anchors onto a single gripping member 20c. Thus, the attachment anchors 70, with their attached strands 30, may be readily exchanged between gripping members 20c, or alternatively combined onto a single gripping member 20c to create a glass extension with a greater number of strands, and therefore a fuller and more dense appearance, and this may be accomplished without necessarily including the first and second gripping members 20a and 20b. In addition, due to the releasable nature of the connection between the third gripping member 20c and the attachment anchor 70, other jewelry attachments, such as shown at 46a-46d, 58, or 58a are also usable with a single sided glass extension based on the third gripping member 20c and releasable attachment anchor 70 of FIGS. 10B-10D.

Figure 11:
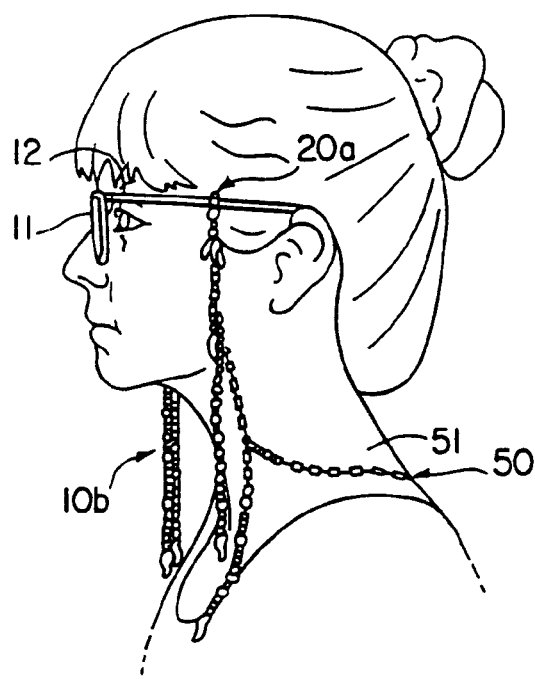
FIG. 11 is a side view of a jewelry article according to a fourth embodiment of the invention.
Figure 12:
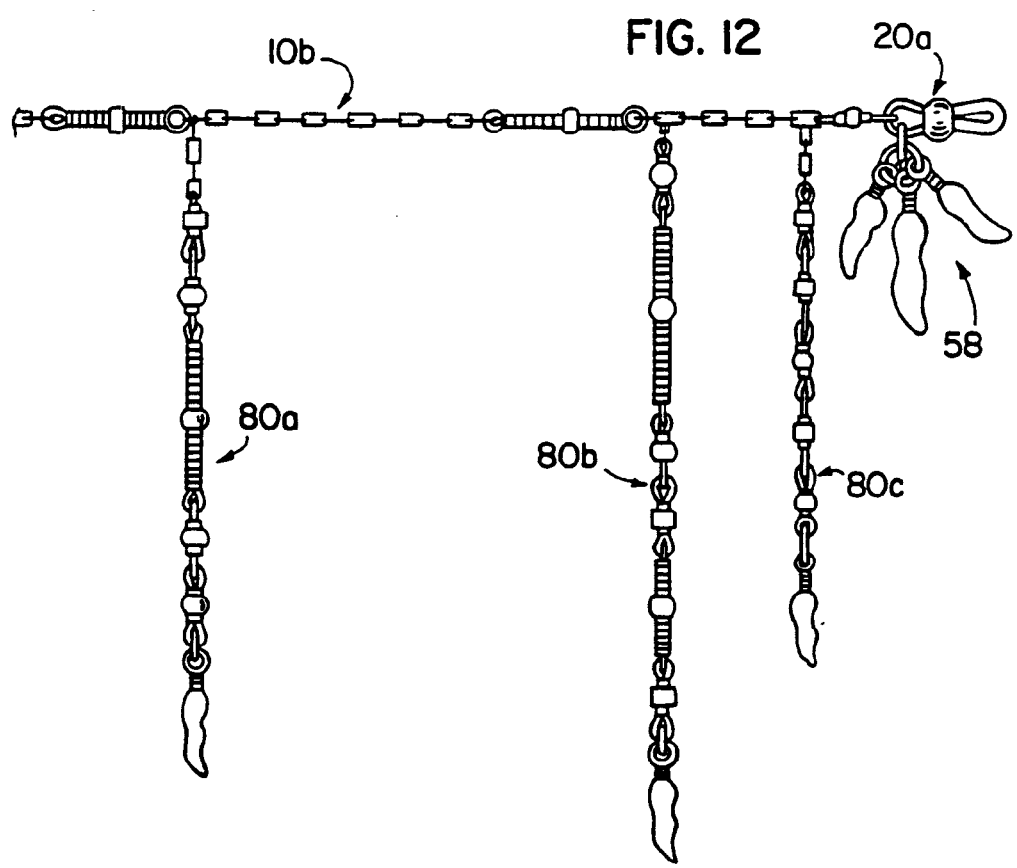
FIG. 12 is a partial plan view of the jewelry article of FIG. 11.

Referring to FIGS. 11 and 12, another embodiment of the glass extension is shown as jewelry article 10B, and may be formed in a manner similar to the embodiment of FIGS. 6-9 and 10A-10D, but with the first and second gripping members 20a and 20b disposed at the ends of the strands 30. The jewelry article 10B also includes the third gripping member 20c which is attached and used in the same manner as in the embodiment of FIGS. 6-9 and 10A-10D, although it is not visible in the views of FIGS. 11 and 12. Since the jewelry article 10B does not have the terminal ends 55 as in the previous embodiment, additional decorative strands 80a-80c are attached at spaced locations extending down from the first and second gripping members 20a and 20b. These decorative strands 80a-80c, in effect, take the place of the terminal ends 55 of the previous embodiment, to provide a glass extension appearance when used in both the first operative configuration as a single-sided glass extension (not shown), and in the second operative configuration as a combined double-sided glass extension and eyeglass holder (FIG. 11).

Referring now to FIGS. 13-16, in yet another embodiment of the invention, the gripping member 20c is attached to the temple arm 12 behind a decorative escutcheon 80 positioned adjacent to the temple of the user when the glass frame 11 is in the operative position so that the escutcheon overlies the gripping member 20c.

Figure 16:
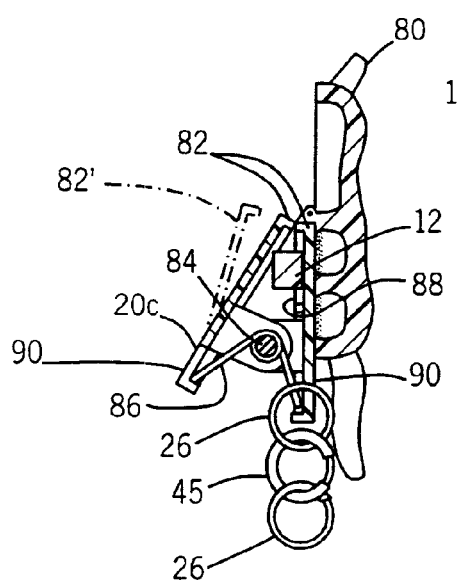
FIG. 16 is a cross-sectional view along line 16-16 of FIG. 14.
Figure 13:
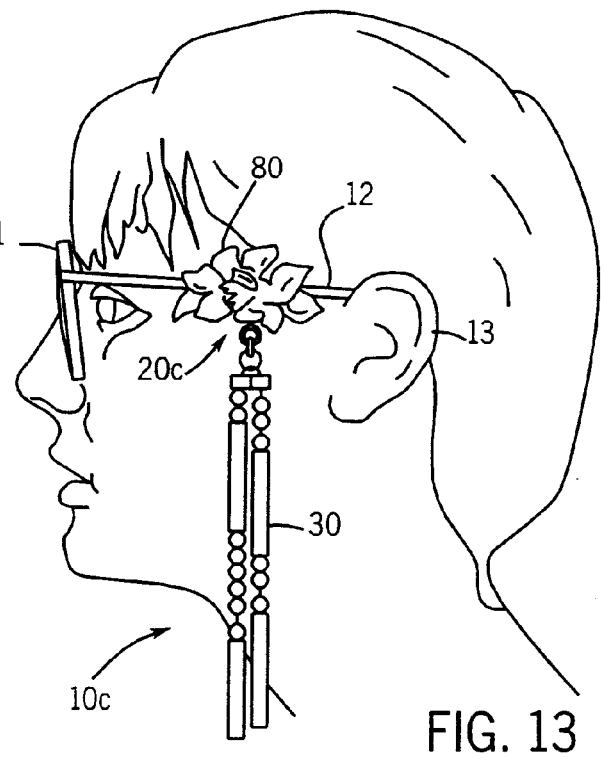
FIG. 13 is a side view of a jewelry article according to a fifth embodiment of the invention.

Referring to FIG. 16, the gripping member 20c may thus be a spring-biased clamp having jaws 82 pivoting about a pivot 84 to be urged to a closed position about the temple arm 12 by action of torsion spring 86. The insides of the jaws 82 contacting the temple arm 12 may be lined with a resilient material 88 so as to prevent damage or scratching of the temple arm 12. The jaws 82 may be released as shown by jaw 82 in phantom in FIG. 16 by a pressing of jaw wings 90 extending away from the pivot 84 on the opposite side of the jaws 82 themselves.

Figure 14:
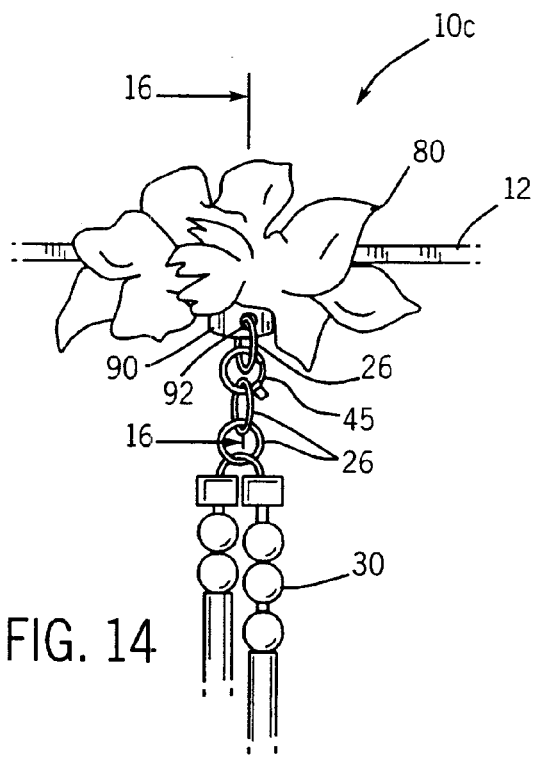
FIG. 14 is a detailed view of the anchor of the embodiment of FIG. 12 from a front side normally exposed to view.
Figure 15:
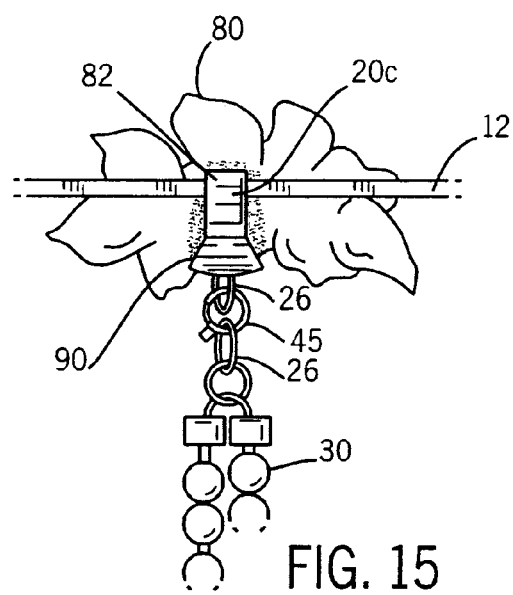
FIG. 15 is similar to FIG. 14 taken from a rear side adjacent to the user's temple.

Referring now to FIG. 16, one jaw wing 90 closest to the escutcheon 80 may include an aperture 92 through which a ring 26 is inserted in a manner analogous to the embodiments previously described. A locking clasp 45 may connect to ring 26 to be followed by one or more additional rings 26 in an interlinking chain configuration to be finally connected to the jewelry strand 30, the latter which may be subject to the many variations previously described. As seen in FIG. 14, the escutcheon 80 serves to provide an attractive visual focus for the point of attachment between the jewelry item 10C and the temple arm 12 and hides the mechanism of the gripping member 20c having a greater bulk than the elastic loop 23 previously described. Nevertheless, it will be apparent that the gripping member 20c may be readily released or attached to the temple arm 12.

When the gripping member 20c is attached to the temple arm 12, the escutcheon 80 extends above and below the temple arm 12 and thus is generally centered along the temple arm 12 providing improved visual balance while substantially covering the gripping member 20c from view.

Two additional embodiments of the invention are shown in FIGS. 17-27. Although there are similar features and elements in these embodiments and those disclosed above and shown in the FIGS. 1-16, to avoid confusion the elements of these embodiments will be described using a new set of reference numbers beginning at number 100 and 100' for the respective embodiments. The primary difference being these two additional embodiments is in the type of jewelry items the constituent strands can form as well as the decorative elements of the strands being arranged asymmetrically between the ends of the linked strands in the first embodiment described below and symmetrically in the second embodiment.

Figure 17:
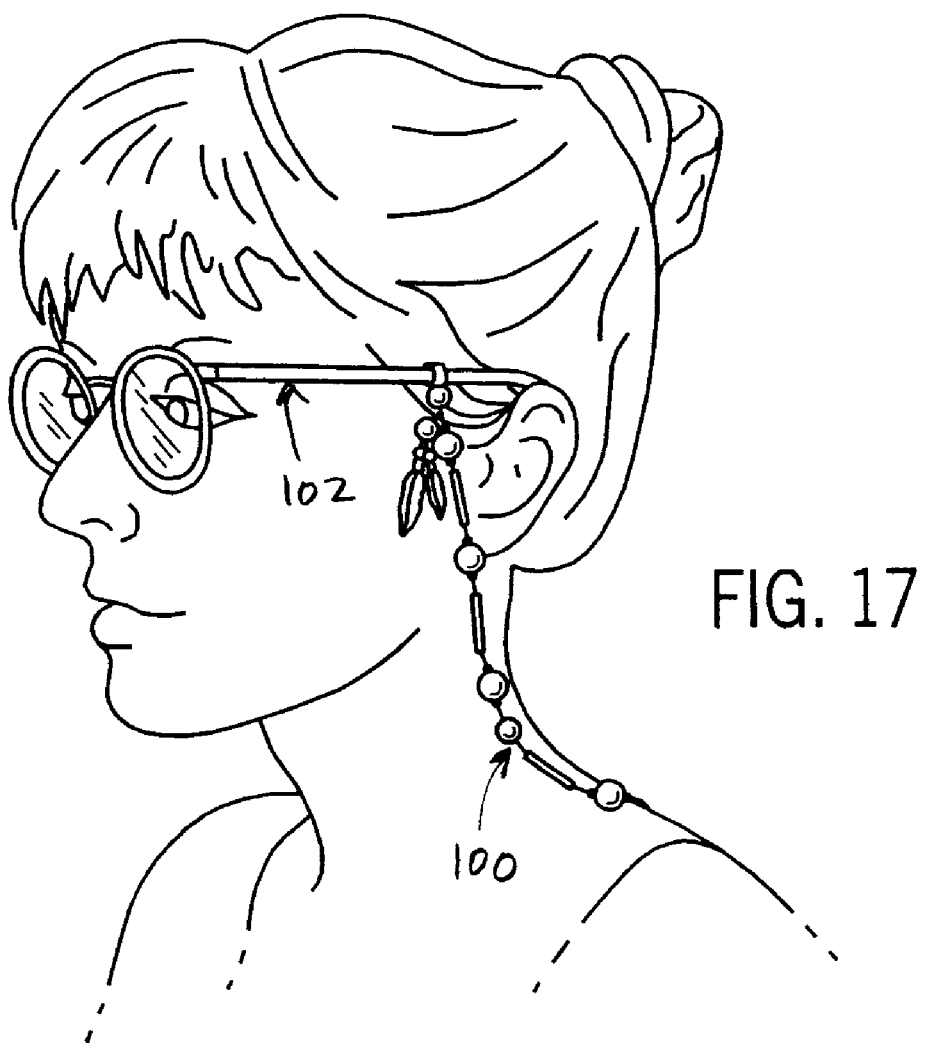
FIG. 17 is a perspective view showing the convertible eyeglass holder article of the present invention in use.
Figures 21, 22:
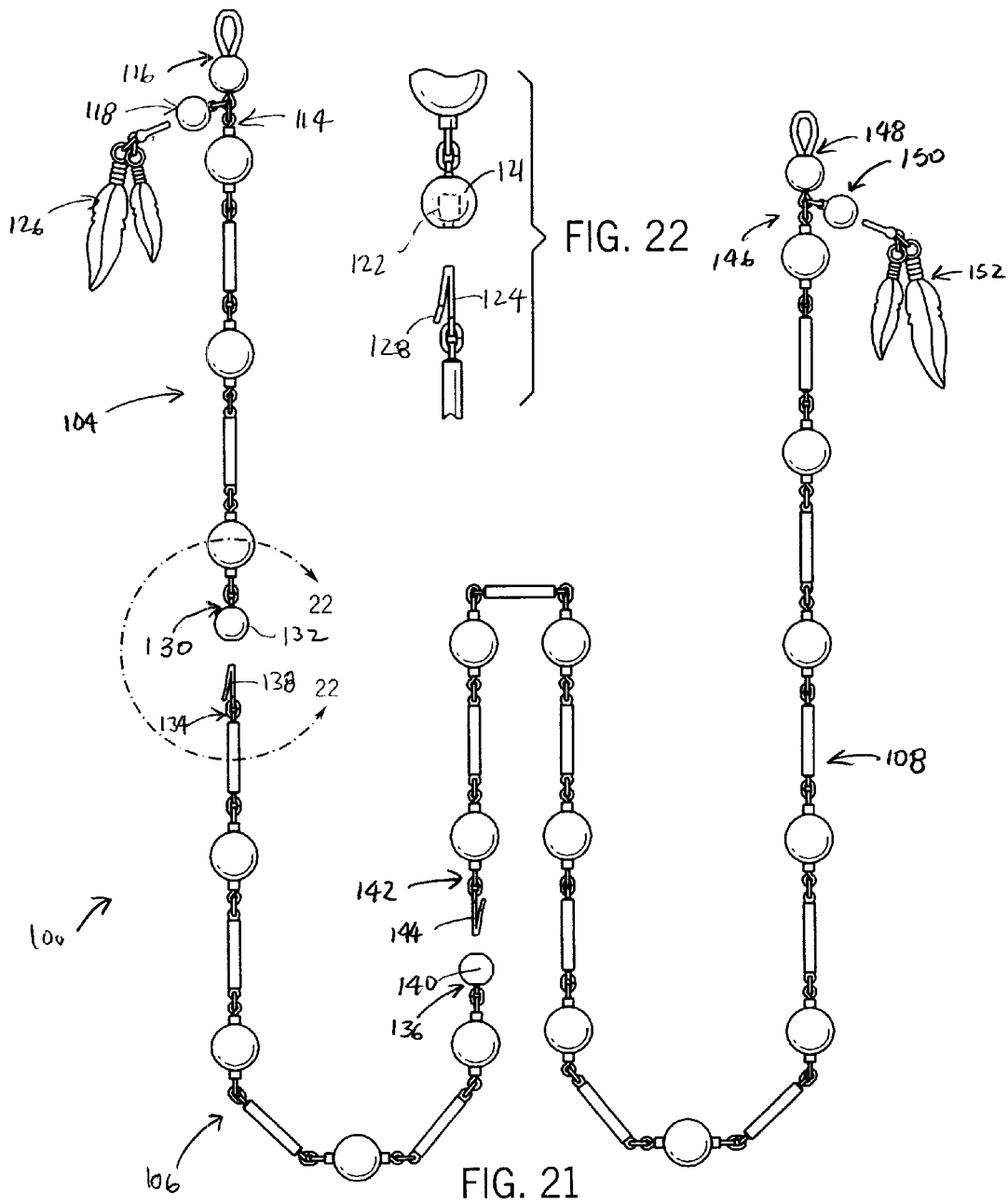
FIG. 21 is a plan view similar to FIG. 18 albeit with the article shown disassembled into its three primary sections.
FIG. 22 is an enlarged partial view taken at arc 22-22 of FIG. 21 showing a connection between two sections of the article.

FIG. 17 illustrates the convertible eyeglass retainer/jewelry article 100 in use as eyeglass retainer being connected to opposite temple arms (one shown in FIG. 17) of a pair of eyeglasses 102 and worn around the neck of the wearer. As better shown in FIGS. 18 and 21, the convertible article 100 is made of three elongated decorative strands 104, 106 and 108. Like previous embodiments the strands are made of a plurality of decorative jewelry elements linked together, in this case preferably including decorative balls or spheres 110 and bars 112 interconnected by strings, metal loops or links, magnetic elements or any other conventional jewelry connectors.

Strand 104 is the shortest strand, including two decorative bars 112 interconnecting three decorative spheres 110. Strand 104 has a first end 114 to which is connected an optical coupler 116 and an accessory coupling member 118. The optical coupler 116 includes an elastic loop 120 sized to slip snuggly onto a temple arm of the eyeglasses. As shown in FIGS. 19 and 20, the optical coupler 116 could be any suitable member for gripping the temple arm, including a spring clip or clamp (FIG. 19) and cinchable loop (FIG. 20). The accessory coupling member 118 releasably attaches an accessory 126, such as the two feather charm shown in the drawings. The accessory coupling member 118 (as well as all of the strand coupling members described below) is one half of a bayonet connection, Referring to FIG. 22, each bayonet connection includes a sphere 121 having a socket 122 (shown in phantom) that mates with a pin clip 124, which is essentially a bent back spring clip that deflects inwardly as it is inserted into the socket 122. The socket 122 is sized so that the body of the pin clip 124 can spring back to its normal position when fully inserted. The pin clip 124 gets trapped in the socket 122 due to its small opening such that the pin clip 124 engages an interior surface of the sphere. This prevents the pin clip 124 from being pulled out of the socket 122 without pinching the pin clip 124 together at a tab 128 residing outside of the socket 122. It should be noted that other types of conventional connection members could be used, including magnets or ring/lobster claw type clasps, as known in the art.

The opposite end 130 of strand 104 includes a strand coupling member 132, in this case a sphere identical to that of the accessory coupling member 118. Strand 106 is an intermediate length strand, having four decorative spheres 110 and four decorative bars 112. Strand 106 has opposite ends 134 and 136 having strand coupling members 138 and 140 consisting of a pin clip 124 and a socketed sphere 121, respectively. Strand 108 is the longest strand, having eleven decorative spheres 110 and ten decorative bars 112. Like strand 104, strand 108 has an end 142 with a strand coupling member 144, in this case a pin clip 124, and an opposite end 146 having an optical coupler 148, accessory coupling member 150 and detachable accessory 152 (identical to respective members 116, 118 and 126).

The convertible article 100 is thus formed into the eyeglass retainer configuration shown in FIG. 18 by linking together the strand coupling members 132 and 138 of respective strands 104 and 106 as well as the strand coupling members 140 and 144 of respective strands 106 and 108. Accessories 126 and 152 may or may not be mounted connected to the accessory coupling members 118 and 150 of respective strands 104 and 108 as desired. The assembled strands are attached to the eyeglasses by slipping the looped ends of the optical couplers 116 and 148 over opposite temple arms. The strands are then placed around the wearer's head and neck for use.

Figure 23:
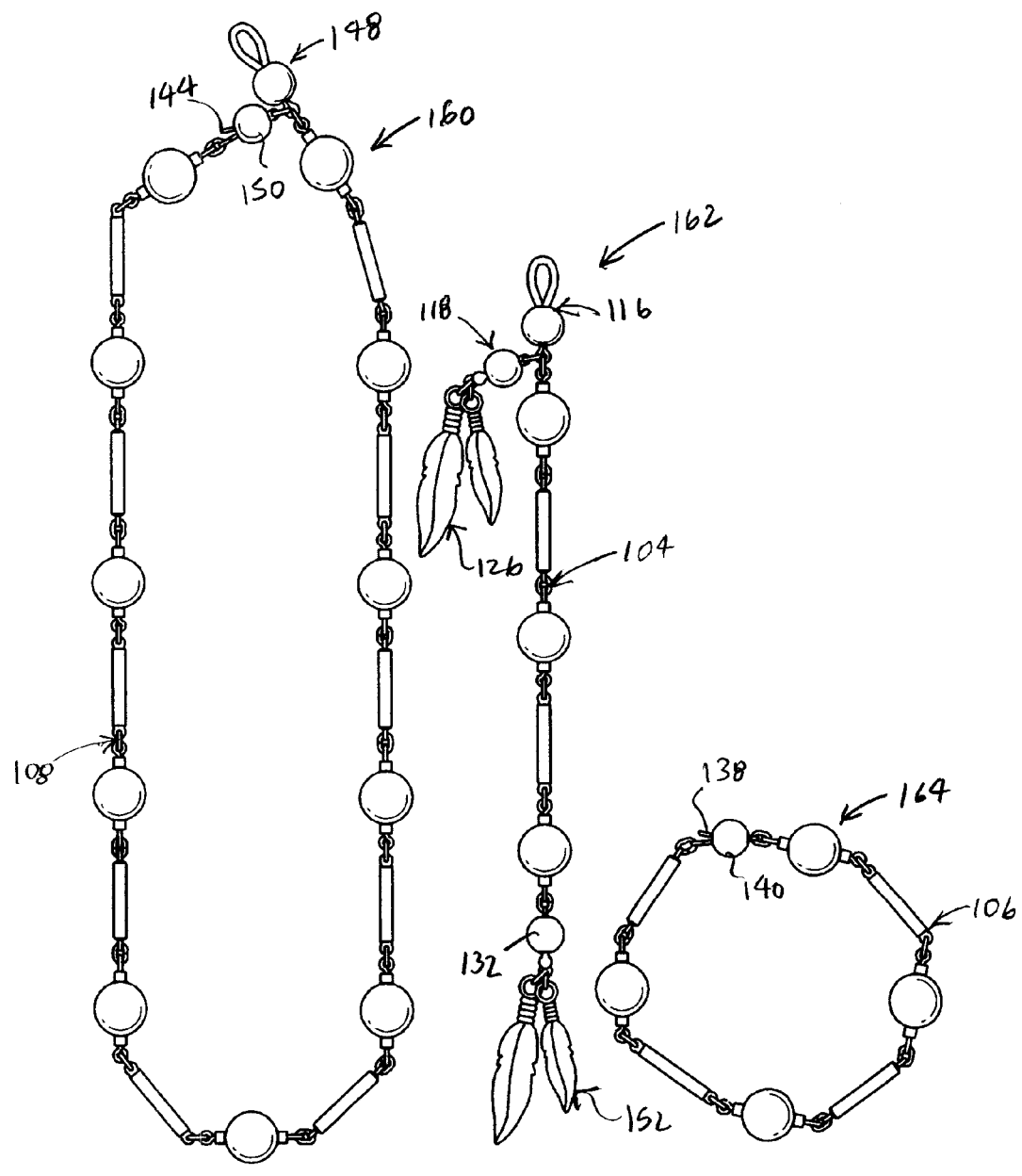
FIG. 23 is plan view of the article of FIG. 21 shown after being converted into three separate jewelry articles, namely a necklace, an eyeglass extension and a bracelet.

With the strands 104, 106 and 108 unlinked, the convertible article 100 can be transformed into one or more other jewelry items. For example, as shown in FIG. 23, the strands can be formed into a necklace 160, a glass extension 162 and a bracelet 164. Preferably, the longest strand 108 forms the necklace 160, by simply linking the strand coupling member 144 (pin clip 124) with the accessory coupling member 150 (socketed sphere 121). Thus, when selected whether to use the male or female parts of the coupling members (accessory and strand), it does not matter which is chosen for a given end also long as they are complimentary between the ends. Similarly, the bracelet 164 is formed using the intermediate length strand 106 by linking the two strand coupling members 138 and 140 together. The glass extension 162 is formed by strand 104, and if desired by attaching the accessory 150 to the strand coupling member 132, and then slipping the optical coupler 116 onto one of the temple arms of the eyeglasses.

Figure 24:
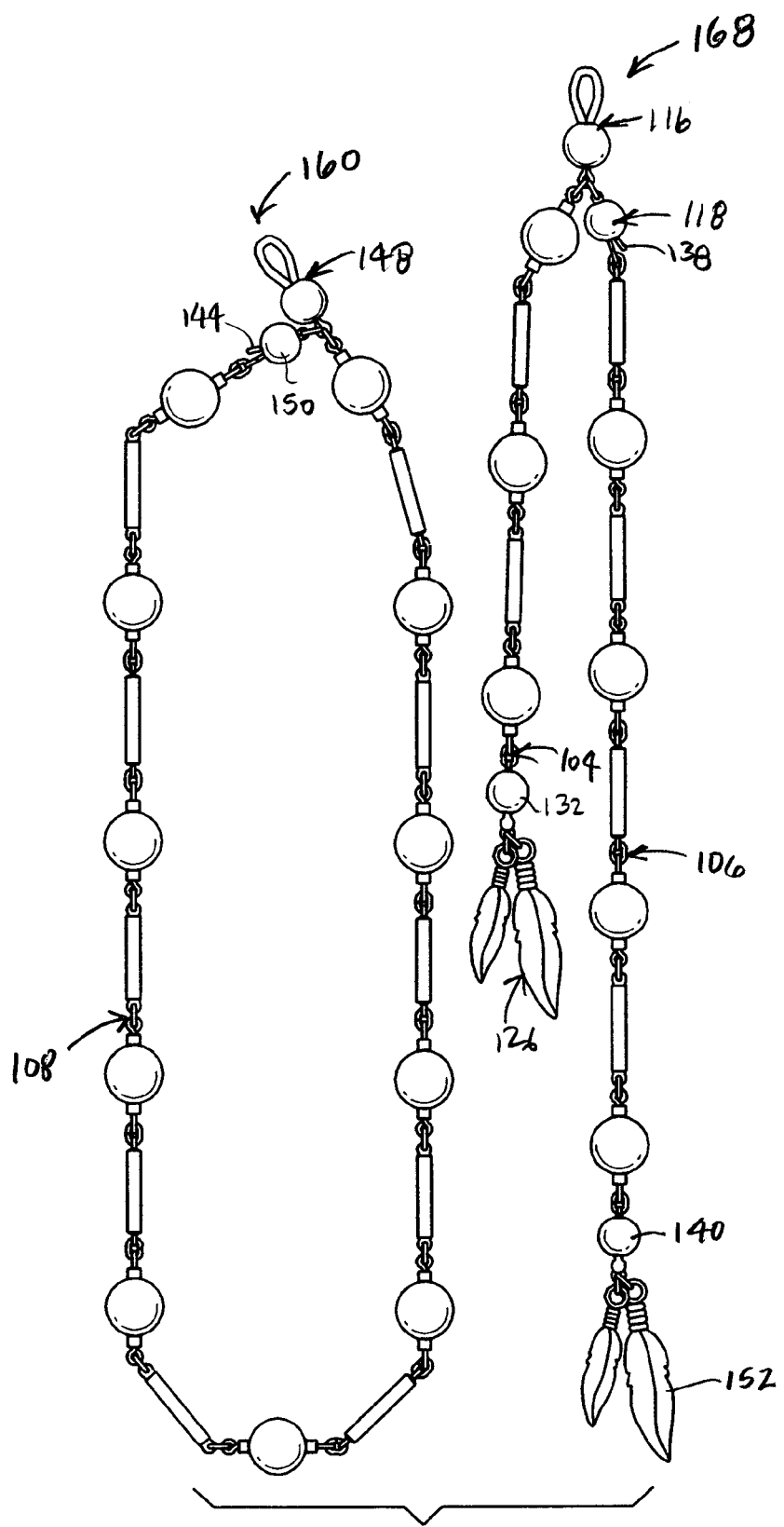
FIG. 24 is plan view similar to FIG. 23 albeit converted into two separate jewelry articles, namely a necklace and a two strand eyeglass extension.

Alternatively, the same three strands 104, 106 and 108 could be formed into the necklace 160 (as described above) and a double-stranded glass extension 168, as shown in FIG. 24. The two strand glass extension 168 is formed by connecting the pin clip strand coupling member 138 of strand 106 to the socketed sphere accessory coupling member 118 of strand 104 and then if desired connecting the accessories 126 and 152 to the strand coupling members 132 and 140 of the respective strands 104 and 106. Like the glass extension 162, this two strand glass extension 168 fits onto one temple arm of the eyeglasses via the optical coupler 116.

Figure 26:
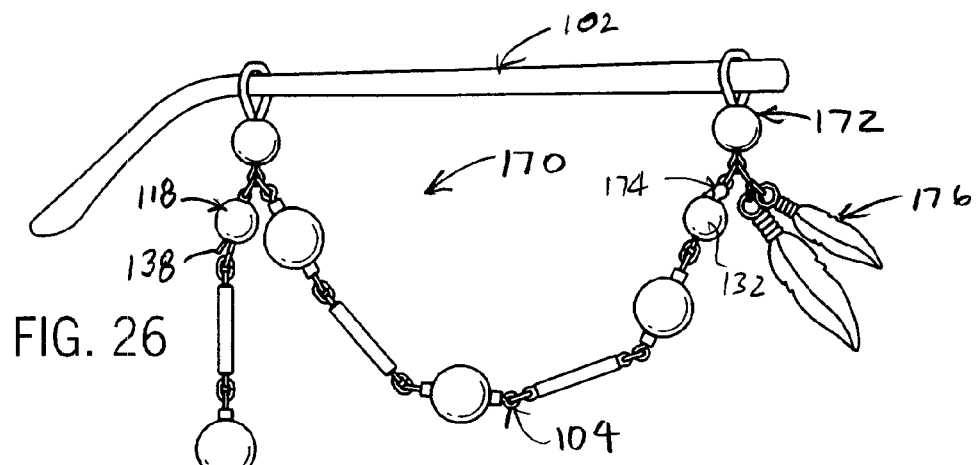
FIG. 26 is a side plan view showing one temple arm of a pair of eyeglasses having a two strands of the article attached at two ends to the temple arm.

As shown in FIG. 26, the convertible article can alternatively form the necklace (as discussed above) as well as a looped or U-shaped glass extension 170 jewelry item, which connects to one temple arm at two spaced apart locations. This U-shaped glass extension 170 is formed by connecting the pin clip strand coupling member 138 of strand 106 to the accessory coupling member 118 of the first strand 104, with the accessory 126 being linked to the socketed sphere coupling member 140. An additional optical coupler 172 is used having a coupling member 174, in this case a pin clip, as well as one or more decorative charms 176, if desired. The optical coupler 172 is connected to strand 104 by linking the coupling member 174 to the strand coupling member 132. This assembly is then mounted to the eyeglasses by sliding the optical couplers 116 and 172 onto a single temple arm one at a time and spacing them apart as desired. Either of the optical couplers can be placed onto the temple arm first depending on the desired aesthetic effect.

Figure 27:
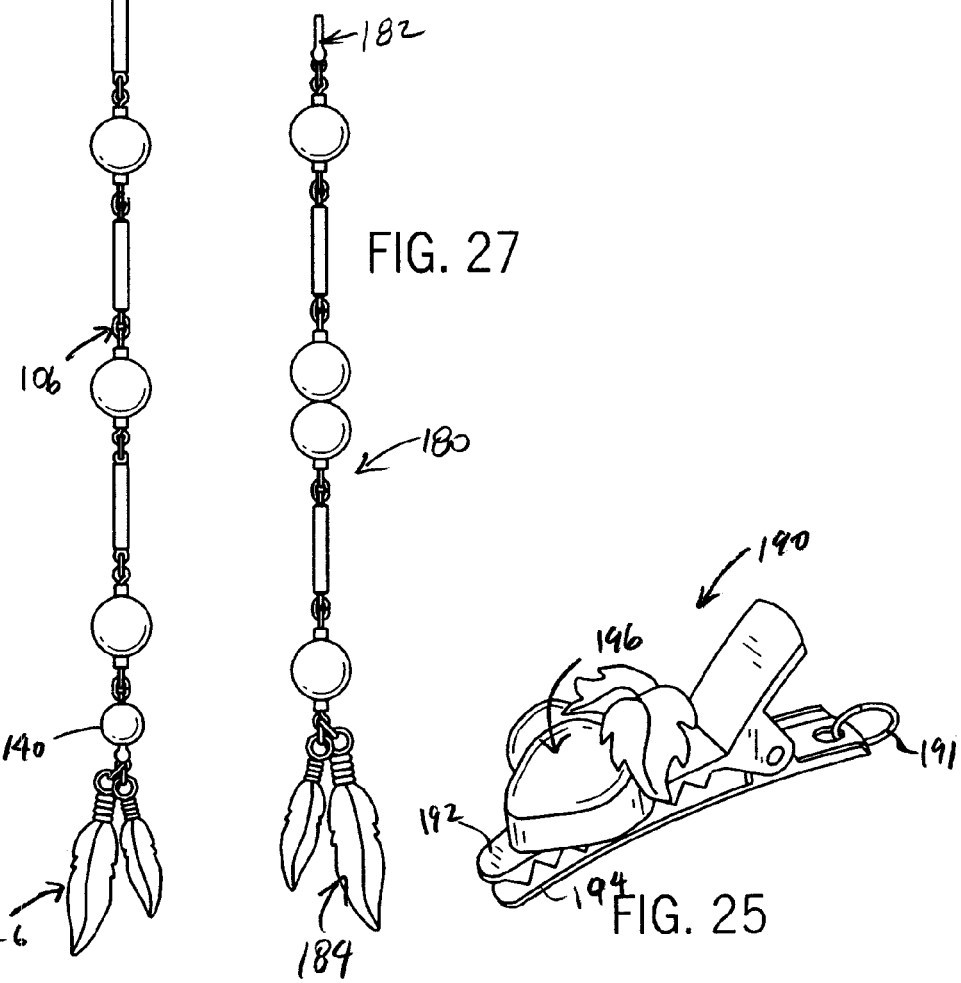
FIG. 27 is a plan view of an additional, shorter decorative strand.

As shown in FIG. 27, strand 106 in the prior configuration could be replaced by an additional, shorter strand 180 having a pin clip coupling member 182 (which could of course by a female end if desired) at one end a charm 184 at the other end, as desired. This additional strand 182 could be used in any of the various glass extensions configurations described above and/or could be used in place of either of the accessories 126 and 152 to form a longer two-piece glass extension or to add a glass extension to the eyeglass retainer configuration.

Figure 25:
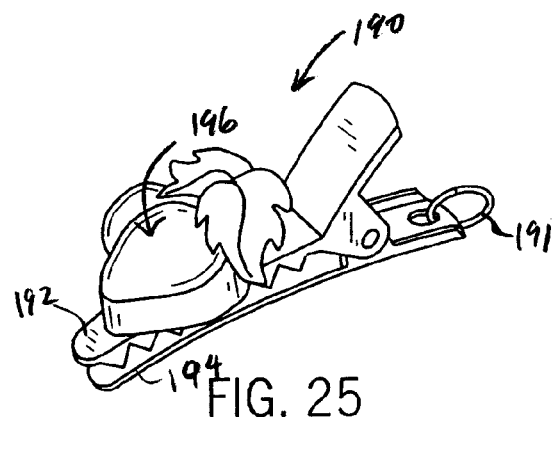
FIG. 25 is a perspective view of an ornamental hair clip for attachment to one or more strands of the article for wearing in one's hair.

Additionally, as shown in FIG. 25, a hair clip 190 could be attached to one or more of the strands via link 191 to create a hair extension jewelry item. The hair clip 190 preferably has a pair of opposable jaws 192 and 194 containing a spring (not shown) resisting parting of the jaws and thus biasing them closed. Preferably, a decorative escutcheon 196 is suitably mounted to jaw 192.

Figure 28:
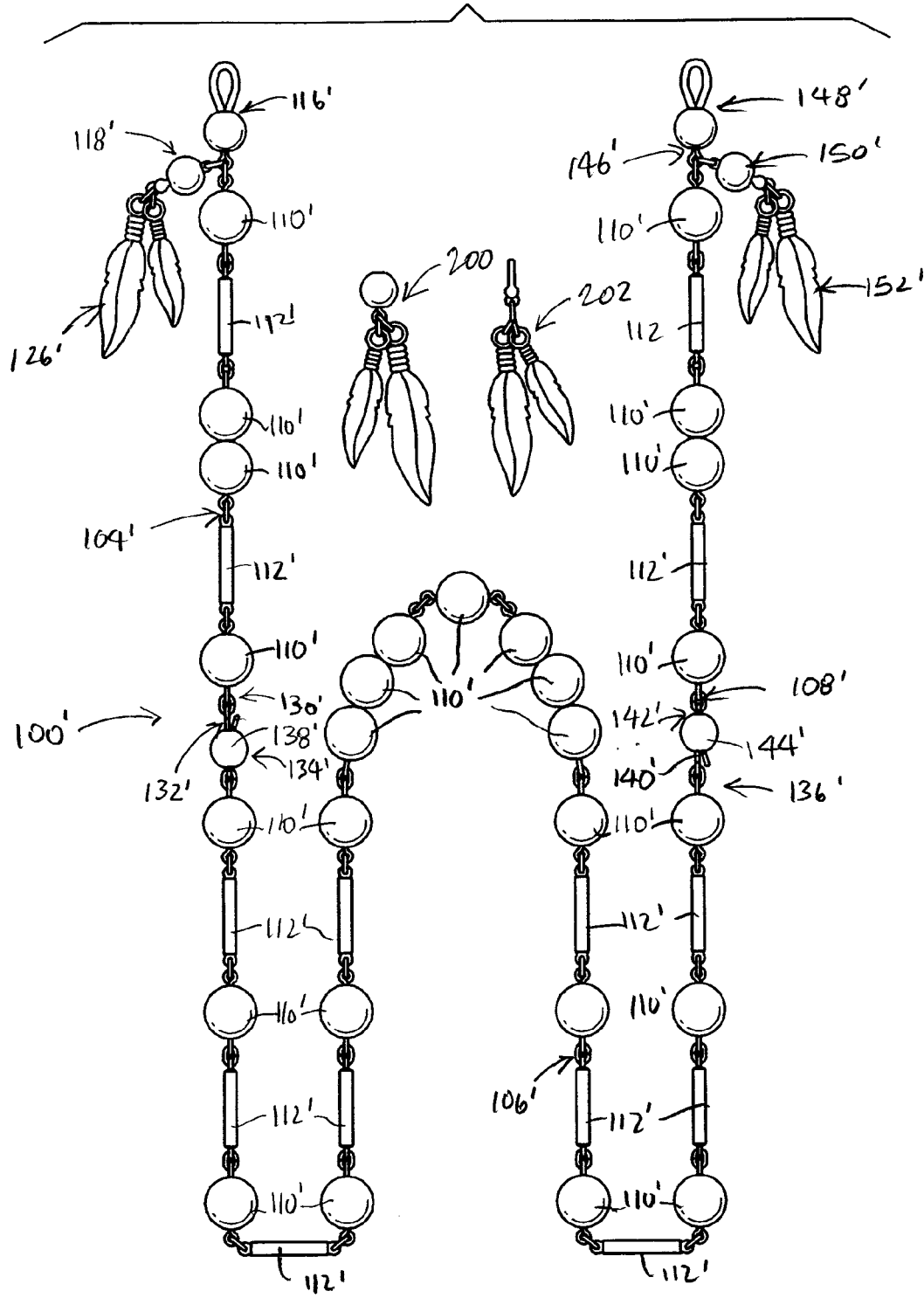
FIG. 28 is a plan view of an alternate embodiment of the convertible eyeglass holder of the present invention shown with two additional ornamental end pieces.
Figure 29:
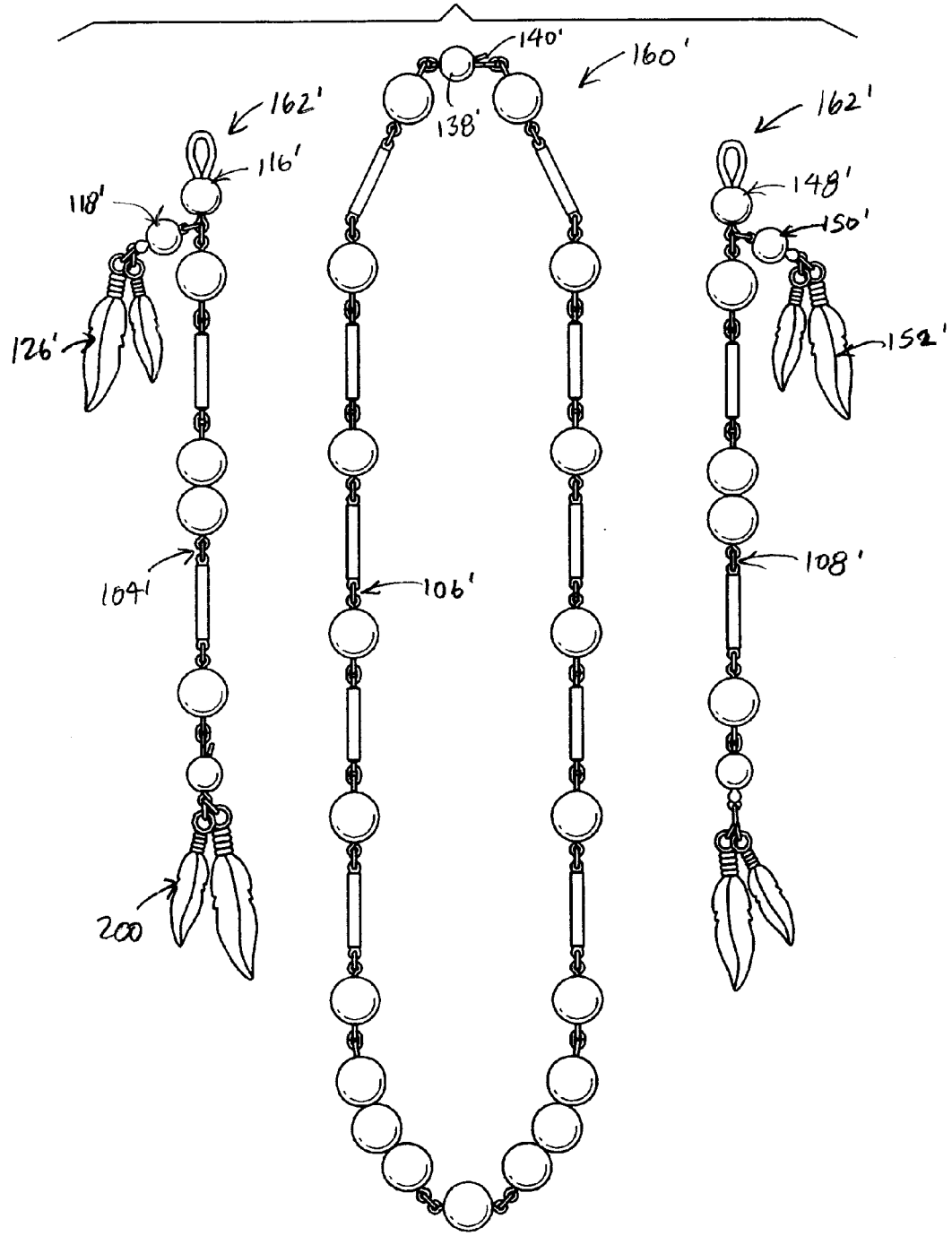
FIG. 29 is a plan view of the article of FIG. 28 shown after being converted into three separate jewelry pieces, namely a necklace and two eyeglass extensions.

With reference to FIGS. 28 and 29, the second of the two embodiments of the convertible article 100' will now be described. This embodiment includes strands 104', 106' and 108'. Strands 104' and 108' each include four decorative spheres 110' and two bars 112' linked together by interconnects as shown. Strands 104' and 108' are identical except for the "polarity" of the strand coupling members, 104' having a pin clip member and strand 108' having a socketed sphere (of course these could be reversed). Strand 104' has a first end 114' including (as described above) an optical coupler 116' and an accessory coupling member 118' to which an decorative accessory 126' is detachable linked and an opposite end 130' including the pin clip strand coupling member 132'. Strand 108' has a complimentary socketed sphere strand coupling member 144' at end 142' rather than the pin clip as well as optical coupler 148' and accessory coupling member 150 with detachable accessory 152' at end 146'. Note that if desired the accessories and accessory coupling members could be completely eliminated without compromising the convertability of this embodiment. Strand 106' is much longer than the other two strands 104' and 108', having nineteen decorative spheres 110' and ten decorative bars 112' arranged symmetrically. Strand 106' has opposite ends 134' and 136' having complimentary strand coupling members 138' and 140'. Two additional charm members 200 and 202 are also included for linking to the free ends of strands 104' and 108' when used as glass extensions, as discussed below.

The strands 104', 106' and 108' link together end to end at the strand coupling members as in the prior embodiment to form the eyeglass retainer configuration. When the strands 104', 106' and 108' are unlinked, the article forms a necklace 160' and a pair of identical glass extensions 162'. The glass extensions 162' are formed by the nearly identical strands 104' and 108' (with or without the accessories and accessory coupling members) with the charm members 200 and 202 attached at the free ends, if desired. The necklace 160' is formed by linking the complimentary strand coupling members 138' and 140' of the longer strand 106'. Note that in this embodiment, the necklace 160' does not include an optical coupler as in the prior embodiment and also is essentially symmetric between its ends proving a different, perhaps more pleasing, aesthetic effect.

The present invention thus provides a three (or more) piece article that can be quickly and easily converted from a decorative eyeglass retainer, allowing a pair of eyeglasses to be suspended about the wear's neck when not used, to a plurality of jewelry pieces, such as a necklace, a bracelet, eyeglass adornments and hair jewelry. These items can be formed largely by unlinking the main three strands from each other and then, in the case of the necklace and bracelet coupling together the opposite ends of a single strand, or in the case of eyeglass extensions simply suspending one of the strands with an optical coupler from the temple arm and allowing its other end to hang freely. Other jewelry items can be formed by linking a strand to additional accessory pieces, such as a hair clip, or by linking two or all three strands together, but in configurations other than simply end to end (as when forming the eyeglass retainer). Simple and dependable (yet decorative) coupling members, forming connections such as bayonet type connections, allow each end of the strands (and accessories) to be simply linked and detached quickly, and in the case of the bayonet connections simply "plugged into one another", to create the desired arrangement. Furthermore, linking the strands not only forms the eyeglass retainer but also is a convenient way to keep together various jewelry items to reduce the likelihood of the items being misplaced.

It should be appreciated that preferred embodiments of the invention have been described above. However, many modifications and variations to these preferred embodiments will be apparent to those skilled in the art, which will be within the spirit and scope of the invention. For example, the particular decorative elements making of the strands not limited to that described herein, and while it is disclosed herein to form the eyeglass retainer by linking together three decorative strands, it is within the scope of the invention to include additional strands so that four or more strands form the eyeglass retainer and can convert to four or more jewelry pieces. Therefore, the invention should not be limited to the described embodiments. To ascertain the full scope of the invention, the following claims should be referenced.

I claim:

1. A convertible eyeglass retainer and jewelry article, comprising:
   a first elongated decorative strand having opposite first and second ends, the first end having an optical coupler for attachment to a temple arm of a pair of eyeglasses and the second end having a strand coupling member;
   a second elongated decorative strand having opposite first and second ends, the first end having an optical coupler for attachment to an opposite temple arm of the eyeglasses and the second end having a strand coupling member; and
   a third elongated decorative strand having opposite first and second ends each having a strand coupling member linkable to the strand coupling members of one of the first and second strands;
   wherein the article forms an eyeglass retainer when the strand coupling members of the third strand are each linked to one strand coupling member of either of the first and second strands;
   wherein the strand coupling members of the third strand are detachable from the strand coupling members of the first and second strands so as to form at least two jewelry items;
   wherein the jewelry items include a necklace and a double-stranded glass extension;
   wherein the necklace is formed by the second strand and the doubled-stranded glass extension is formed by connecting the first end of the first strand to the first end of the third strand.

2. The convertible article of claim 1, wherein the third strand is longer than the first strand and the first strand is shorter than the second strand.

3. The convertible article of claim 1, wherein the first end of the first strand includes an accessory coupling member detachably linkable to the first end of the second strand for forming the double-stranded glass extension.

* * * * *